Oct. 18, 1932.   A. H. KEHOE   1,883,236
ALTERNATING CURRENT DISTRIBUTION SYSTEM
Original Filed Feb. 1, 1924
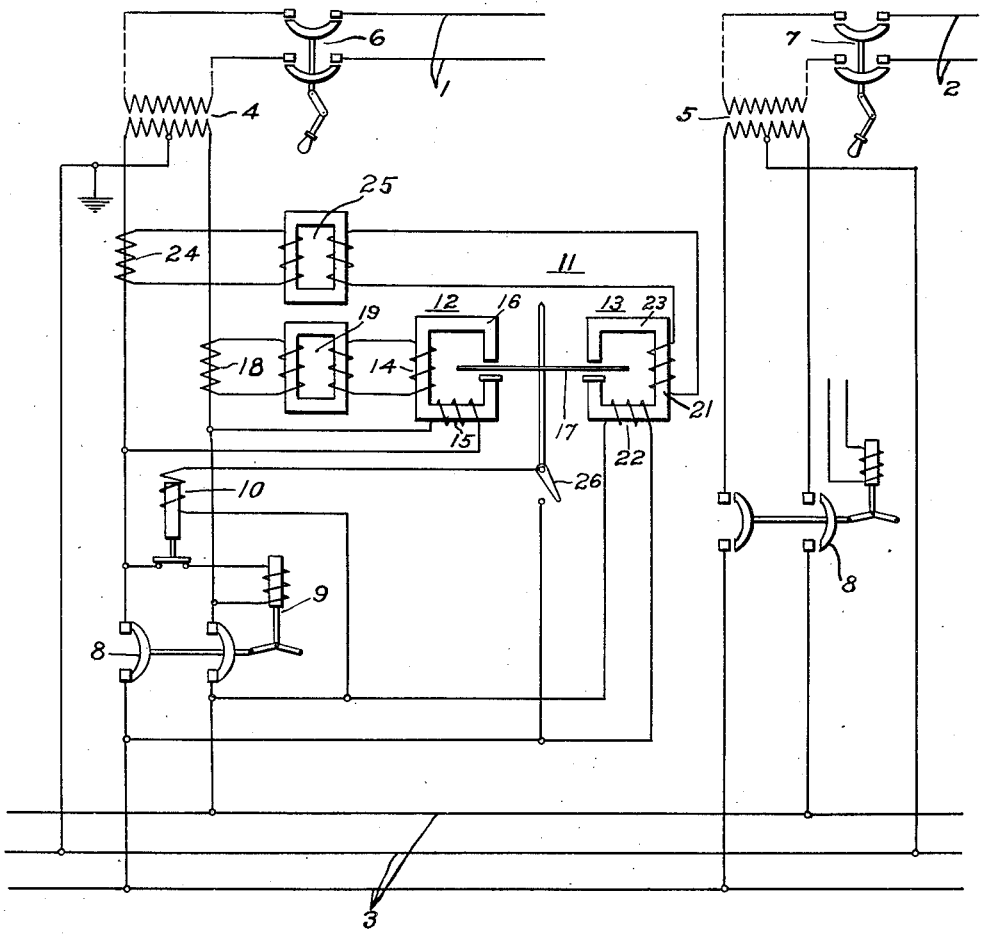
INVENTOR
Arthur H. Kehoe.
BY
ATTORNEY Patented Oct. 18, 1932                                                                                1,883,236

UNITED STATES PATENT OFFICE

ARTHUR H. KEHOE, OF RUTHERFORD, NEW JERSEY, ASSIGNOR TO WESTINGHOUSE ELECTRIC & MANUFACTURING COMPANY, A CORPORATION OF PENNSYLVANIA

ALTERNATING CURRENT DISTRIBUTION SYSTEM

Original application filed February 1, 1924, Serial No. 690,014. Divided and this application filed August 8, 1929. Serial No. 384,347.

This application is a division of applicant's copending application, Serial No. 690,014 filed Feburary 1, 1924.

This invention relates to systems of alternating-current distribution and particularly to systems of distribution of alternating currents in which a plurality of feeder circuits or supply circuits, including associated distribution transformers, are adapted to supply energy to a common secondary low-tension network.

One object of this invention is to provide a system of control whereby the secondary winding of the distribution transformer may be automatically connected to a secondary low-tension network when the primary winding of the transformer is energized through a high-tension primary circuit from a main supply station and the transformer is in energy-delivering condition relative to the low-tension network.

Another object of this invention is to provide a distribution system of the above-indicated character that shall have an automatically controlled switch or interrupter means for disconnecting the secondary winding of a transformer from the low-tension network when the direction of flow of energy between the secondary winding of the transformer and the low-tension network is reversed and that shall automatically reconnect the transformer to the network when the transformer is in energy-delivering condition relative to the network.

This invention, therefore, comprehends an automatic reclosing circuit interrupter for controlling the connection and disconnection of transformers to secondary networks.

In this invention, I have provided means responsive to the potential difference between the transformer and the network for controlling the connection of the transformer to the network and also means responsive to the direction of energy transfer between the transformer and the network for controlling the disconnection of the transformer when the energy is fed to the transformer from the secondary network instead of from the transformer to the secondary network.

Inasmuch as the occurrence of faulty conditions in a high-tension-feeder circuit may cause the disconnection of the feeder circuit from its source, it is desirable to isolate the transformer from other source of energy supply, such as the secondary network, in order to permit workmen to clear with safety the faulty condition in the high-tension circuit. Since the high-tension lines may be disconnected from their source of energy at the main station, it is essential that they should not be energized through the distribution transformers because the transformer voltage, if any, might be sufficient to cause injury to those working on a high-tension line.

In this invention, one of the features relates to the means for preventing such feedback of energy when the network interrupter is in open position, and, therefore, the invention has special importance when the system involves relatively high voltages.

It is important to provide a system that, in addition to being fully automatic in its opening and closing operations, shall avoid the energization of the high-tension system through the transformer from the network. Therefore, by my invention, I provide a system which meets the condition of absolute electrical separation of the circuits when the network switch or the network interrupter is open and thus eliminates entirely any feed back from the network to the high-tension side of the transformers.

The particular feature of this invention which provides the means for electrically separating the network from the transformer deals with the use of interrupter-control means which includes a relay having a plurality of electromagnets, one of the electromagnets being energized according to the voltage on the supply side or transformer side of the interrupter and tending to close the interrupter and another electromagnet being energized according to the voltage on the load side or network side of the interrupter and tending to maintain the interrupter open. The electrical circuits in the relay are entirely separate.

This invention will be better understood by reference to the single figure of the drawing which is a diagrammatic view of a system embodying my invention.

As illustrated, energy may be supplied, through a plurality of high-tension primary circuits 1 and 2, which may be energized from a single source or independent synchronized sources, to a common network 3 and distribution transformers 4 and 5. Circuit interrupters 6 and 7 are provided for the respective circuits 1 and 2 to be controlled at the stations from which the primary circuits 1 and 2 are energized to disconnect primary windings of the distribution transformers 4 and 5 from the energizing source or sources.

In order to control automatically the connection of the secondary windings of the transformer 4 to the network 3 and disconnection therefrom, I provide in each feeder, a network switch or interrupter 8 including an operating coil 9 and a voltage relay 10 for controlling the circuit of the operating coil. Although the circuit interrupter 8 is shown as having a control means, energized in accordance with the network voltage, obviously, control means of other types may be utilized, such as a shunt-trip or a current-trip type or a low-voltage trip as disclosed in the copending application of J. S. Parsons, Serial No. 39,947 filed June 27, 1925.

In order to control the operation of the network switch or interrupter 8, I provide a relay 11 of the differential induction type comprising two magnetic elements 12 and 13.

The element 12 is provided with a current winding 14 and a potential or voltage winding 15 which cooperate to energize the magnetic core 16 in such manner as to actuate a rotatable disc 17 in the one or the other direction, according to the degree of energization of the winding 15 and the direction of the current in the winding 14.

The current coil 14 is energized from the circuit through a current transformer 18 and a saturable transformer 19, the purpose of the latter being to limit the value of current which may be caused to traverse the winding 14. The winding 15 is energized from the transformer side of the network switch 8 in accordance with the voltage of the secondary side of the transformer 4.

The element 13 of the differential relay 11 is similarly provided with a current winding 21 and a potential winding 22 that cooperate to energize a magnetizable core 23 to effect the operation of the disc member 17 in the one or the other direction depending upon the voltage and the direction of energy traversing the windings. It is to be understood, of course, that each of the elements 12 and 13 is provided with suitable shading coils, or lag-links 27, as is well understood in the art, and in the present invention, I prefer to employ adjustable lag-links, as disclosed in the above-mentioned copending application of J. S. Parsons.

The current winding 21 is energized from the circuit through a current transformer 24 and a saturable transformer 25 to preclude the excessive energization of the winding 21. The potential winding 22 is energized from the network side of the network interrupter 8 and is energized in accordance with the voltage of the network or load circuit 3.

The induction-disc armature 17 is controlled by the respective elements 12 and 13 to control the operation of the switch or contact member 26 which controls the circuit of the voltage relay 10 associated with the operating coil 9 of the low-tension switch or interrupter 8.

The several elements of the relay 11 are intended to represent watthour-meter elements and, for the sake of simplicity, are illustrated as C-type magnets. The relay 11 is so calibrated and adjusted that the network voltage alone tends to close the relay contacts or switch 26, while the transformer voltage alone tends to open the relay switch 26. The relay is so calibrated and adjusted that, when the transformer voltage is at least equal to that of the network, so that the transformer is in energy-deliverying condition, the torque developed by the transformer voltage through the coil 15 will overcome the torque developed by the potential winding 22 energized from the network 3, and the switch 26 will, therefore, be opened.

As the switch 26 is opened, the relay 10 closes the circuit of the operating coil 9 which is thereupon energized from the secondary winding of the transformer 4 to close the network switch 8. The transformer 4 is thereupon connected to the network 3.

As shown, the operating coil 9 closes the circuit interrupter 8 and maintains it in closed position so long as the contacts of the relay 10 are closed, and, accordingly, so long as the contact 26 of the relay 11 is open. When the contacts of relay 10 are opened, the winding 9 is deenergized, and the interrupter 8 is permitted to open. It is apparent, however, that various other means for controlling the opening and closing of the breaker 8 may be employed, as is well understood by those skilled in this art.

The relations of the current windings 14 and 21 are such that, when energy is delivered to the network 3 in the proper direction, the relay 11 will be actuated to maintain the contacts 26 open. However, upon the occurrence of a condition which effects a reversal in the direction of energy transfer, so that energy is delivered to the transformer 4 from the network 3, the relay 11 is then operated to close the switch 26, thereupon operating the relay switch 10 to open the circuit of the operating and holding coil 9. The network interrupter 8 is thereupon permitted to open, and the transformer 4 is disconnected from the network 3 until the conditions which caused the reversal in energy are cleared.

Such a reversal in energy might be caused by a fault in the transformer 4 or in the high-voltage circuit supplying the transformer 4, or by the disconnection of the primary circuit between the transformer and the source of supply, as, for example, by opening the high-tension switch 6. In the latter case, a reverse energy would be that supplied as magnetizing energy through the transformer core from the network 3, the latter of which is energized from other uninterrupted sources, such as, through the transformer 5.

Similar switching equipment and control apparatus is provided for the feeder circuit associated with the transformer 5, but such equipment is not illustrated or described herein, inasmuch as the construction and operation of that apparatus is the same as that illustrated in connection with transformer 4.

A special advantage of this invention lies in the fact that there is no electrical connection between the network 3 and the transformer 4 when the network switch 8 is in open position. This result is accomplished by means of the special differential relay apparatus 11 already described. For further description and information, reference may be had to the parent copending application hereinbefore referred to of which this is a division.

Such changes and modifications in this invention as may be made by those skilled in the art are to be considered as within the scope of the appended claims, excepting that matter which is disclosed by the prior art.

I claim as my invention:

1. The combination with a circuit-interrupter connected to a load circuit, of interrupter control means including relay apparatus having a plurality of windings and flux-shifting means associated therewith, one of the windings being energized according to the voltage on the supply side only of the interrupter and cooperating with one of the flux-shifting means in such manner to tend to close the interrupter and another winding being energized according to the voltage on the load side only of the interrupter and cooperating with another of the flux-shifting means in such manner to tend to maintain the interrupter open, said relay apparatus including interrupter-opening means responsive to magnitude and phase position of the current through the interrupter when closed.

2. The combination consisting of a plurality of feeder circuits supplying a common network load, each feeder circuit including a transformer, a circuit interrupter between the transformer and the load, and interrupter control means including relay apparatus having a plurality of windings and flux-shifting means associated therewith, one of the windings being energized according to the voltage on the transformer supply side of the interrupter and cooperating with one of the flux-shifting means in such manner to tend to close the interrupter and another winding being energized according to the voltage on the load side of the interrupter and cooperating with another of the flux-shifting means in such manner to tend to maintain the interrupter open, said relay apparatus including interrupter-opening means responsive to magnitude and phase position of the current through the interrupter when closed.

3. The combination consisting of a plurality of feeder circuits for supplying a common network load, each feeder circuit including a high-tension switch, a transformer, a low-tension circuit interrupter between the transformer and the load, and interrupter control means including relay apparatus having a plurality of windings and flux-shifting means associated therewith, one of the windings being energized according to the voltage on the transformer side of the interrupter and cooperating with one of the flux-shifting means in such manner to tend to close the interrupter and another winding being energized according to the voltage on the load side of the interrupter and cooperating with another of the flux-shifting means in such manner to tend to maintain the interrupter open, said relay apparatus including interrupter-opening means responsive to magnitude and phase position of the current through the interrupter when closed.

4. The combination with a circuit-interrupter connected between a transformer supply circuit and a load circuit, of interrupter control means including closing means having a winding connected to the supply side only of the interrupter and means cooperating therewith in such manner to tend to close the interrupter and having another winding connected to the load side only of the interrupter and means cooperating therewith in such manner to tend to maintain the interrupter open and including opening means responsive to the magnitude and phase position of the current through the interrupter.

5. The combination with a circuit interrupter, of interrupter control means including a differential relay having opposing or bucking elements for controlling the closure of the interrupter in accordance with the voltages on both sides of the interrupter, said control means including interrupter-opening means responsive to magnitude and phase position of current flow traversing the interrupter.

6. In an alternating-current system of distribution, a load circuit, a plurality of feeder circuits for supplying energy to said load circuit, circuit-interrupting means associated with each feeder circuit, and control means for each of said circuit-interrupting means including a directional relay means having two induction-motor elements, the voltage energization of said elements being in accordance with the feeder and load-circuit voltages, respectively.

7. In a system of distribution including two alternating-current circuits, and switching means for connecting said circuits, the combination of means for effecting the automatic opening and reclosing of said switching means including a rotatable member and two induction-motor elements for exerting opposed independent torques thereon, said motor elements having current and voltage windings, respectively, the voltage windings being energized in accordance with the respective voltages of the two circuits.

8. In a system of electric distribution including an alternating-current feeder circuit, a load circuit, a transformer connected between said feeder and load circuits, and a circuit interrupter in the secondary circuit of said transformer, the combination of means for closing said circuit interrupter including a movable member, a plurality of motor elements for exerting independent torques on said movable member and having windings so connected to said circuits that the resultant torque on said movable member is a function of the circuit voltages, said means being operative to effect the opening of said circuit interrupter depending upon the magnitude and phase position of current flow therethrough.

9. In a system of electric distribution including an alternating-current feeder circuit, a load circuit, a transformer connected between said feeder and load circuits, and a circuit interrupter is the secondary circuit of said transformer, the combination of means for controlling said circuit interrupter including relay apparatus having a rotatable member, a plurality of winding means for exerting independent opposed torques on said rotatable member and so connected to said circuits that the resultant torque exerted on said rotatable member varies in accordance with the difference between the voltage magnitudes of the respective circuits when the circuit interrupter is open and in accordance with the magnitude and phase position of current flow when the circuit interrupter is closed.

10. In a system of electric distribution including a plurality of alternating-current feeder circuits, a load circuit, a transformer connected between each feeder circuit and said load circuit, and a circuit interrupter in the secondary circuit of each transformer, the combination of control means for each circuit interrupter including a rotatable member and two induction-motor elements for exerting independent opposed torques thereon and having energizing windings so connected to said circuits as to effect a resultant torque in a direction to close said circuit interrupter under predetermined feeder and load-circuit voltage conditions and to open said circuit interrupter depending upon the magnitude and phase position of current flow therethrough.

11. In a system of electric distribution including an alternating-current feeder circuit, a load circuit, a transformer connected between said feeder and load circuits, and switching means in the secondary circuit of said transformer, the combination of control means for effecting the automatic opening and reclosing of said switching means including relay apparatus having a rotatable member, two induction-motor elements associated therewith, means for energizing one of said motor elements to effect a torque on said rotatable member in accordance with the magnitude of the feeder-circuit voltage, and means for energizing the other said motor element to effect an opposed torque on said rotatable member in accordance with the magnitude of the load-circuit voltage when said circuit interrupter is open, said control means being operative to effect the opening of said circuit interrupter when the current flow is from the load circuit to the feeder circuit.

12. In an alternating-current network system of distribution, a plurality of feeder circuits, a load circuit energized thereby, and switching means for connecting each of said feeder circuits and said load circuit, the combination of control means for each of said switching means including relay apparatus having a rotatable member and two induction-motor elements associated therewith for exerting opposing torques, and means for energizing said motor elements from said circuits in such manner as to preclude the actuation of said control means to close the circuit interrupter under predetermined system conditions, said relay apparatus being operative to open the circuit interrupter depending upon the magnitude and phase position of current flow therethrough.

13. In an alternating-current network system of distribution, a plurality of feeder circuits, a load circuit, and switching means connecting each of said feeder and load circuits, the combination of means for controlling the automatic opening and reclosing of each of said switching means including directional relay means having a movable member and two independent torque-producing means energized from said circuits for cooperating with said movable member, there being no electrical connection between said load and feeder circuits through said control means when said switching means is open.

14. In a means for controlling the automatic opening and reclosing of a switching means connected between an alternating-current feeder circuit and a load circuit, the combination of relay apparatus having a rotatable member and two induction-motor elements energized from said circuits for effecting independent opposed torques on said movable member, said control means being effectively energized to close said switching means depending upon the magnitudes of the respective feeder and load-circuit voltages and to open said switching means depending upon the magnitude and phase position of current flow therethrough.

15. In a control means for the automatic opening and reclosing of a switching means connected between an alternating-current feeder circuit and a load circuit, the combination of directional relay apparatus including a rotatable member, two independent torque-producing means associated therewith, said torque-producing means being energized in accordance with the current and voltage of said circuits, there being no electrical connection between said circuits through said control means when said switching means is open.

In testimony whereof, I have hereunto subscribed my name this 22nd day of July, 1929.

ARTHUR H. KEHOE.